United States Patent
Shiratori

(10) Patent No.: US 10,358,378 B2
(45) Date of Patent: Jul. 23, 2019

(54) NEAR INFRARED CUTOFF FILTER GLASS

(71) Applicant: AGC Inc., Chiyoda-ku (JP)

(72) Inventor: Makoto Shiratori, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/818,042

(22) Filed: Nov. 20, 2017

(65) Prior Publication Data

US 2018/0072610 A1    Mar. 15, 2018

Related U.S. Application Data

(63) Continuation of application No. PCT/JP2016/071158, filed on Jul. 19, 2016.

(30) Foreign Application Priority Data

Jul. 24, 2015 (JP) ................................. 2015-146620

(51) Int. Cl.
| | |
|---|---|
| *C03C 3/247* | (2006.01) |
| *C03C 4/08* | (2006.01) |
| *C03C 4/02* | (2006.01) |
| *G02B 5/20* | (2006.01) |
| *G02B 5/22* | (2006.01) |

(52) U.S. Cl.
CPC ................ *C03C 3/247* (2013.01); *C03C 4/02* (2013.01); *C03C 4/08* (2013.01); *G02B 5/208* (2013.01); *G02B 5/226* (2013.01); *C03C 2204/00* (2013.01)

(58) Field of Classification Search
CPC .. C03C 3/247; C03C 4/02; C03C 4/08; C03C 4/082
See application file for complete search history.

(56) References Cited

U.S. PATENT DOCUMENTS

| | | | | |
|---|---|---|---|---|
| 4,792,536 A | * | 12/1988 | Pecoraro | ................ C03B 3/02 501/70 |
| 2004/0082460 A1 | | 4/2004 | Yamane et al. | |
| 2013/0135714 A1 | * | 5/2013 | Kondo | ................ C03C 3/247 359/359 |

FOREIGN PATENT DOCUMENTS

| | | |
|---|---|---|
| JP | 1-219037 | 9/1989 |
| JP | 2004-83290 | 3/2004 |
| JP | 2004-137100 | 5/2004 |
| JP | 2011-132077 | 7/2011 |
| JP | 2011132077 A * | 7/2011 |
| JP | 2011-162409 | 8/2011 |
| JP | 2011162409 A * | 8/2011 |
| JP | 2015-78086 | 4/2015 |
| JP | 2015078086 A * | 4/2015 |
| JP | 2016-60671 | 4/2016 |
| JP | 2016060671 A * | 4/2016 |
| WO | WO 2010/119964 A1 | 10/2010 |

OTHER PUBLICATIONS

International Search Report dated Oct. 25, 2016 in PCT/JP2016/071158, filed on Jul. 19, 2016.

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

It is an object of the present invention to provide near infrared cutoff filter glass having a high transmittance in a visible light range and a low transmittance in a near infrared light range and being excellent in the devitrification resistance, even though the concentration of Cu components in the glass is high for forming a thin plate.

A near infrared cutoff filter glass, which comprises, as represented by cation percentage: $P^{5+}$ 30 to 50%, $Al^{3+}$ 5 to 20%, $R^+$ 20 to 40% (wherein $R^+$ is the total amount of $Li^+ + Na^+ + K^+$), $R'^{2+}$ 5 to 30% (wherein $R'^{2+}$ is the total amount of $Mg^{2+} + Ca^{2+} + Sr^{2+} + Ba^{2+} + Zn^{2+}$), $Cu^{2+}$ 3 to 15% and comprises, as represented by anion percentage: $O^{2-}$ 30 to 90% and $F^-$ 10 to 70%, wherein $(Li^+ + Na^+ + K^+)/(P^{5+} + Al^{3+})$ is from 0.45 to 1.0, and $(Sr^{2+} + Ba^{2+} + Cu^{2+})/(Al^{3+} + Mg^{2+} + Ca^{2+})$ is from 0.5 to 1.0.

16 Claims, No Drawings

NEAR INFRARED CUTOFF FILTER GLASS

TECHNICAL FIELD

The present invention relates to a near infrared cutoff filter glass which is used for a color calibration filter of e.g. a digital still camera or color video camera and which is particularly excellent in the light transmittance in the visible region.

BACKGROUND ART

A solid-state imaging element such as a CCD or a CMOS used for e.g. a digital still camera has a spectral sensitivity over from the visible region to the near infrared region in the vicinity of 1,200 nm. Accordingly, since no good color reproducibility will be obtained as it is, the luminosity factor is corrected by using a near infrared cutoff filter glass having a specific substance which absorbs infrared rays added. As such a near infrared cutoff filter glass, an optical glass having CuO added to fluorophosphate glass, in order to selectively absorb wavelengths in the near infrared region and to achieve a high climate resistance, has been developed and used. As such glass, the compositions are disclosed in Patent Documents 1 to 3.

PRIOR ART DOCUMENTS

Patent Documents

Patent Document 1: JP-A-1-219037
Patent Document 2: JP-A-2004-83290
Patent Document 3: JP-A-2004-137100

DISCLOSURE OF INVENTION

Technical Problem

Cameras, etc. in which a solid state imaging sensor is mounted are being miniaturized and thinned. Being accompanied with it, it is desired to miniaturize and thin imaging devices and their mounted devices similarly. In a case where a near infrared cutoff filter glass having Cu added to fluorophosphate glass is made to be thin, it is necessary to increase the concentration of Cu components which influence on optical properties. However, if the concentration of Cu components in glass is increased, although the desired optical property at an infrared ray side can be obtained, the transmittance of light at a visible light region deteriorates, such being problematic.

Further, if the concentration of Cu components increases, the risk of the devitrification at the time of molding glass tends to be high. If the devitrification results, the productivity may deteriorate extremely.

It is an object of the present invention to provide a near infrared cutoff filter glass which has a high light transmittance in a visible region and is excellent in the devitrification resistance, even though the concentration of Cu components in glass increases, accompanied with making the glass thin.

Solution to Problems

As a result of extensive studies, the present inventors have found that by strictly controlling the relationship of the contents of $Li^+$, $Na^+$, $K^+$, $P^{5+}$ and $Al^{3+}$ in glass (namely, $(Li^++Na^++K^+)/(P^{5+}+Al^{3+})$) and the relationship of the contents of $Sr^{2+}$, $Ba^{2+}$, $Cu^{2+}$, $Al^{3+}$, $Mg^{2+}$ and $Ca^{2+}$ (namely $Sr^{2+}+Ba^{2+}+Cu^{2+})/(Al^{3+}+Mg^{2+}+Ca^{2+}))$, a near infrared cutoff filter glass having devitrification resistance and optical properties superior to conventional glass is obtained.

The near infrared cutoff filter glass of the present invention comprises, as represented by cation percentage:
  $P^{5+}$ 30 to 50%,
  $Al^{3+}$ 5 to 20%,
  $R^+$ 20 to 40% (wherein $R^+$ is the total amount of $Li^++Na^++K^+$),
  $R'^{2+}$ 5 to 30% (wherein $R'^{2+}$ is the total amount of $Mg^{2+}+Ca^{2+}+Sr^{2+}+Ba^{2+}+Zn^{2+}$),
  $Cu^{2+}$ 3 to 15%
and comprises, as represented by anion percentage:
  $O^{2-}$ 30 to 90% and
  $F^-$ 10 to 70%,
wherein $(Li^++Na^++K^+)/(P^{5+}+Al^{3+})$ is from 0.45 to 1.0, and $(Sr^{2+}+Ba^{2+}+Cu^{2+})/(Al^{3+}+Mg^{2+}+Ca^{2+})$ is from 0.5 to 1.0.

Further, as one embodiment, the near infrared cutoff filter glass of the present invention, does not contain at least one member selected from Mg and S.

Further, in one embodiment of the near infrared cutoff filter glass of the present invention, in a plate thickness of from 0.05 to 0.25 mm, the wavelength at which the transmittance becomes 50%, is from 600 nm to 650 nm, and the transmittance at a wavelength of 400 nm is at least 70%.

Advantageous Effects of Invention

According to the present invention, a near infrared cutoff filter glass which is excellent in optical properties such that the transmittance of in the light visible region is high, and the transmittance in the near infrared light region is low and which is excellent in the devitrification resistance, can be obtained.

DESCRIPTION OF EMBODIMENTS

The near infrared cutoff filter glass of the present invention (hereinafter referred to also as "the glass of the present invention") comprises, as represented by cation percentage:
  $P^{5+}$ 30 to 50%,
  $Al^{3+}$ 5 to 20%,
  $R^+$ 20 to 40% (wherein $R^+$ is the total amount of $Li^++Na^++K^+$),
  $R'^{2+}$ 5 to 30% (wherein $R'^{2+}$ is the total amount of $Mg^{2+}+Ca^{2+}+Sr^{2+}+Ba^{2+}+Zn^{2+}$),
  $Cu^{2+}$ 3 to 15%
and comprises, as represented by anion percentage:
  $O^{2-}$ 30 to 90% and
  $F^-$ 10 to 70%,
wherein $(Li^++Na^++K^+)/(P^{5+}+Al^{3+})$ is from 0.45 to 1.0, and $(Sr^{2+}+Ba^{2+}+Cu^{2+})/(Al^{3+}+Mg^{2+}+Ca^{2+})$ is from 0.5 to 1.0.

Now, the reason why the contents (represented by cation % and anion %) of components constituting the glass of the present invention are limited as described above and preferred ranges of other components and their reasons will be described below.

In the present specification, unless otherwise specified, the contents and the total content of cationic components are represented as cation %, and the contents and the total content of anionic components are represented as anion %.

The expression "to" showing the above numerical range is used to include the numerical values before and after thereof as the lower limit value and the upper limit value, and hereinafter in this specification, "to" is used to have the same meaning unless otherwise specified.

$P^{5+}$ is a main component to form glass (glass forming oxide) and is an essential component to improve the near infrared cutting performance. However, if the content of $P^{5+}$ is less than 30%, no sufficient effect will be obtained, and if the content of $P^{5+}$ exceeds 50%, that glass becomes unstable, and the climate resistance deteriorates, such being undesirable. The content of $P^{5+}$ is preferably from 30 to 48%, more preferably from 32 to 46%, further preferably from 34 to 44%.

$Al^{3+}$ is a main component to form glass (glass forming oxide) and is an essential component to improve the climate resistance, etc. However, if the content of $Al^{3+}$ is less than 5%, no sufficient effect will be obtained, and if the content of $Al^{3+}$ exceeds 20%, glass becomes unstable, and the near infrared cutting performance deteriorates, such being undesirable. The content of $Al^{3+}$ is preferably from 6 to 18%, more preferably from 6.5 to 15%, further preferably from 7 to 13%. Further, it is not preferred to use $Al_2O_3$ and $Al(OH)_3$ as a material for $Al^{3+}$, since the molten temperature increases, unmolten products are formed, and glass becomes unstable due to the reduction of the amount of $F^-$ to be charged. Thus, $AlF_3$ is preferably used.

$R^+$ (wherein $R^+$ is the total amount of alkali metal ions of $Li^+$, $Na^+$ and $K^+$ to be contained) is an essential component to lower the glass melting temperature, to lower the glass liquid phase temperature, to stabilize the glass, etc. However, if the content of $R^+$ is less than 20%, no sufficient effect will be obtained, and if the content of $R^+$ exceeds 40%, the glass tends to be unstable, such being undesirable. The content of $R^+$ is preferably from 20 to 38%, more preferably from 22 to 37%, further more preferably from 24 to 36%. Here, $R^+$ is the total amount of $Li^+$, $Na^+$ and $K^+$ contained in glass, namely, $Li^+ + Na^+ + K^+$. Further, as $R^+$, at least one member selected from $Li^+$, $Na^+$ and $K^+$ is used.

$Li^+$ is a component to lower the glass melting temperature, to lower the glass liquid phase temperature, to stabilize the glass, etc. The content of $Li^+$ is preferably from 5 to 40%. However, if the content of $Li^+$ is less than 5%, no sufficient effect will be obtained, and if the content of $Li^+$ exceeds 40%, the glass tends to be unstable, such being undesirable. The content of $Li^+$ is more preferably from 8 to 38%, further preferably from 10 to 35%, particularly preferably from 15 to 30%.

Although not an essential component, $Na^+$ is a component to lower the glass melting temperature, to lower the glass liquid phase temperature, to stabilize the glass, etc. If contained, the content of $Na^+$ is preferably from 5 to 40%. If the content of $Na^+$ is less than 5%, no sufficient effect will be obtained, and if the content of $Na^+$ exceeds 40%, the glass tends to be unstable, such being undesirable. The content of $Na^+$ is more preferably from 5 to 35%, further preferably from 6 to 30%.

Although not an essential component, $K^+$ is a component to lower the glass melting temperature, to lower the glass liquid phase temperature, etc. If contained, the content of $K^+$ is preferably from 0.1 to 30%. If contained, and the content of $K^+$ is less than 0.1%, no sufficient effect will be obtained, and if the content of $K^+$ exceeds 30%, the glass tends to be unstable, such being undesirable. The content of $K^+$ is more preferably from 0.5 to 25%, further preferably from 0.5 to 20%.

$R'^{2+}$ (wherein $R'^{2+}$ is the total amount alkaline earth metal ions of $Mg^{2+}$, $Ca^{2+}$, $Sr^{2+}$, $Ba^{2+}$ and $Zn^{2+}$ to be contained) is an essential component to lower the glass melting temperature, to lower the glass liquid phase temperature, to stabilize the glass, to improve the strength of the glass, etc. However, if the content of $R'^{2+}$ is less than 5%, no sufficient effect will be obtained, and if the content of $R'^{2+}$ exceeds 30%, glass tends to be unstable, the infrared cutting performance deteriorates, the strength of glass deteriorates, such being undesirable. The content of $R'^{2+}$ is preferably from 5 to 28%, more preferably from 7 to 25%, further preferably from 9 to 23%, most preferably from 10 to 20%. Here, $R'^{2+}$ is the total amount of $Mg^{2+}$, $Ca^{2+}$, $Sr^{2+}$, $Ba^{2+}$ and $Zn^{2+}$ to be contained, namely $Mg^{2+}+Ca^{2+}+Sr^{2+}+Ba^{2+}+Zn^{2+}$. Further, as $R'^{2+}$, at least one member selected from $Mg^{2+}$, $Ca^{2+}$, $Sr^{2+}$, $Ba^{2+}$ and $Zn^2$, is used.

$Mg^{2+}$ is a component to lower the glass melting temperature, to lower the glass liquid phase temperature, to improve the strength of the glass, etc. If contained, the content of $Mg^{2+}$ is preferably from 1 to 30%. However, the glass tends to be unstable, and the devitrification property tends to be poor due to $Mg^{2+}$. Particularly, in a case where it is required to set the concentration of Cu high, it is preferred to contain no $Mg^{2+}$. If contained, and the content of $Mg^{2+}$ is less than 1%, no sufficient effect will be obtained, and if the content of $Mg^{2+}$ exceeds 30%, the glass tends to be extremely unstable, and the dissolving temperature of glass tends to be high, such being undesirable. The content of $Mg^{2+}$ is more preferably from 1 to 25%, further preferably from 1 to 20%.

Although not an essential component, $Ca^{2+}$ is a component to lower the glass melting temperature, to lower the glass liquid phase temperature, to stabilize the glass, to improve the strength of the glass, etc. If contained, the content of $Ca^{2+}$ is preferably from 1 to 30%. If contained, and the content of $Ca^{2+}$ is less than 1%, no sufficient effect will be obtained, and if the content of $Ca^{2+}$ exceeds 30%, the glass tends to be unstable, and the devitrification property tends to be poor, such being undesirable. The content of $Ca^{2+}$ is more preferably from 1 to 25%, further preferably from 1 to 20%.

Although not an essential component, $Sr^{2+}$ is a component to lower the glass melting temperature, to lower the glass liquid phase temperature, to stabilize the glass, etc. If contained, the content of $Sr^{2+}$ is preferably from 1 to 30%. If contained, and the content of $Sr^{2+}$ is less than 1%, no sufficient effect will be obtained, and if the content of $Sr^{2+}$ exceeds 30%, the glass tends to be unstable, the devitrification property tends to be poor, and the strength of the glass tends to be low, such being undesirable. The content of $Sr^{2+}$ is more preferably from 1 to 25%, further preferably from 1 to 20%.

Although not an essential component, $Ba^{2+}$ is a component to lower the glass melting temperature, to lower the glass liquid phase temperature, to stabilize the glass, etc. If contained, the content of $Ba^{2+}$ is preferably from 1 to 30%. If the content of $Ba^{2+}$ is less than 1%, no sufficient effect will be obtained, and if the content of $Ba^{2+}$ exceeds 30%, the glass tends to be unstable, the devitrification property tends to be poor, and the strength of the glass tends to be low, such being undesirable. The content of $Ba^{2+}$ is more preferably from 1 to 25%, further preferably from 1 to 20%.

Although not an essential component, $Zn^{2+}$ is a component to lower the glass melting temperature, to lower the glass liquid phase temperature, to improve the chemical durability of the glass, etc. If contained, the content of $Zn^{2+}$ is preferably from 1 to 30%. However, if contained, and the content of $Zn^{2+}$ is less than 1%, no sufficient effect will be obtained, and if the content of $Zn^{2+}$ exceeds 30%, the glass tends to be unstable, the devitrification property tends to be poor, the solubility of the glass deteriorates, such being undesirable. The content of $Zn^{2+}$ is more preferably from 1 to 25%, further preferably from 1 to 20%.

$Cu^{2+}$ is an essential component for near infrared cutting. However, if the content of $Cu^{2+}$ is less than 3%, no sufficient effect will be obtained when the thickness of the glass is made to be thin. Further, if the content of $Cu^{2+}$ exceeds 15%, the transmittance in the visible region tends to deteriorate, such being undesirable. The content of $Cu^{2+}$ is preferably from 3.2 to 12%, more preferably from 3.3 to 10%, further preferably from 3.4 to 9%.

Although not essential components, both $Ce^{4+}$ and $Sb^{3+}$ are components to improve the transmittance.

If both $Ce^{4+}$ and $Sb^{3+}$ are contained, the total content is preferably from 0.1 to 4%. If the content is less than 0.1%, the desired effect cannot be obtained. Further, if the content exceeds 4%, the transmittance deteriorates, and the stability deteriorates, such being undesirable. The total content is preferably from 0.2 to 2.5%, further preferably from 0.3 to 2.0%, particularly preferably from 0.4 to 1.5%.

Although not an essential component, $Ce^{4+}$ is a component to improve the transmittance. $Ce^{4+}$ has a higher oxidation-reduction potential than $Cu^{2+}$ and has a lower ionization tendency. If both elements coexist, $Cu^{2+}$ having a higher ionization tendency is likely to be oxidized, whereby an effect of suppressing formation of Cu+ which lowers the transmittance at the vicinity of the wavelength of 400 nm can be obtained. In a case where $Ce^{4+}$ is contained, the content is preferably from 0.01 to 4%. If the content is less than 0.01%, the desired effect cannot be obtained, since the amount of Ce is too small. Further, if the content exceeds 4%, the absorption of the ultraviolet region by the Ce components interferes with the visible region, and thereby the transmittance at the vicinity of the wavelength of 400 nm deteriorates. The content is more preferably from 0.01 to 3%, further preferably from 0.05 to 3%, particularly preferably from 0.08 to 2.5%, most preferably from 0.1 to 2%.

Although not an essential component, $Sb^{3+}$ has a higher oxidation-reduction potential than $Cu^{2+}$ and an effect similar to $Ce^{4+}$. The oxidation property of glass is improved, and the increase of the concentration of $Cu^+$ ions is suppressed, whereby an effect of improve the transmittance in the visible region is obtained. The content of $Sb^{3+}$ is preferably from 0 to 1%. If $Sb^{3+}$ is contained, and the content exceeds 1%, the stability of glass deteriorates, such being undesirable. The content is more preferably from 0.01 to 0.8%, further preferably from 0.05 to 0.5, most preferably from 0.1 to 0.3%.

The glass of the present invention preferably contains substantially no S. Although S has an effect as a clarifying agent, S is not preferred, since the devitrification property of the glass deteriorates.

$O^{2-}$ is an essential component to stabilize the glass, to increase the transmittance in the visible region, to improve mechanical properties such as strength, hardness and elasticity, to decrease UV transmittance, etc. However, if the content of $O^{2-}$ is less than 30%, no sufficient effect will be obtained, and if the content of $O^{2-}$ exceeds 90%, the glass tends to be unstable, and the climate resistance deteriorates, such being undesirable. The content of $O^{2-}$ is more preferably from 30 to 80%, further preferably from 30 to 75%.

$F^-$ is an essential component to stabilize the glass and to improve the climate resistance. However, if the content of $F^-$ is less than 10%, no sufficient effects will be obtained, and if the content of $F^-$ exceeds 70%, the transmittance in the visible region decreases, mechanical properties such as strength, hardness and elasticity deteriorate, and the volatility becomes high, which causes the increase of striae, such being undesirable. The content of $F^-$ is preferably from 10 to 50%, more preferably from 15 to 40%.

In the present invention, by controlling the relationship of the contents of $Li^+$, $Na^+$, $K^+$, $P^{5+}$ and $Al^{3+}$ (namely, $(Li^++Na^++K^+)/(P^{5+}+Al^{3+})$), the desired value of the visible light transmittance can be obtained. Here, $(Li^++Na^++K^+)$ is the total amount of $Li^+$, $Na^+$, $K^+$, and $(P^{5+}+Al^{3+})$ is the total amount of $P^{5+}$ and $Al^{3+}$. If $(Li^++Na^++K^+)/(P^{5+}+Al^{3+})$ is less than 0.45, the melting temperature increases, and the transmittance in the visible region deteriorates. On the other hand, if $(Li^++Na^++K^+)/(P^{5+}+Al^{3+})$ exceeds 1.0, the glass is unstable, and the climate resistance deteriorates, such being undesirable. $(Li^++Na^++K^+)/(P^{5+}+Al^{3+})$ is preferably from 0.47 to 0.9, more preferably from 0.50 to 0.85, further preferably from 0.52 to 0.8.

In the present invention, by controlling the relationship of the contents of $Sr^{2+}$, $Ba^{2+}$, $Cu^{2+}$, $Al^{3+}$, $Mg^{2+}$ and $Ca^{2+}$ (namely, $(Sr^{2+}+Ba^{2+}+Cu^{2+})/(Al^{3+}+Mg^{2+}+Ca^{2+})$), the devitrification property is excellent. Here, $(Sr^{2+}+Ba^{2+}+Cu^{2+})$ is the total amount of $Sr^{2+}$, $Ba^{2+}$ and $Cu^{2+}$, and $(Al^{3+}+Mg^{2+}+Ca^{2+})$ is the total amount of $Al^{3+}$, $Mg^{2+}$ and $Ca^{2+}$. In the devitrification test, foreign matters observed in glass were analyzed, and they were identified as Cu—Sr—Ba—P—O type compounds. It has been found that it is effective to increase Al and reduce Ba (a reduced component is substituted by Mg and Ca. Particularly, it is preferred substitute Ba by Ca) to suppress the foreign matters. Cu is an essential component and cannot be reduced. However, by controlling the above mentioned parameters, it is possible to suppress the devitrification. If $(Sr^{2+}+Ba^{2+}+Cu^{2+})/(Al^{3+}+Mg^{2+}+Ca^{2+})$ is less than 0.5, the glass is unstable. If $(Sr^{2+}+Ba^{2+}+Cu^{2+})/(Al^{3+}+Mg^{2+}+Ca^{2+})$ exceeds 1.0, the effect to suppress the devitrification cannot be obtained, such being undesirable. $(Sr^{2+}+Ba^{2+}+Cu^{2+})/(Al^{3+}+Mg^{2+}+Ca^{2+})$ is preferably from 0.55 to 0.98, more preferably from 0.58 to 0.96, further preferably from 0.6 to 0.95.

In general, $Fe^{3+}$ to be contained as impurities in glass has a lower oxidation-reduction potential than $Cu^{2+}$, whereby $Cu^{2+}$ is easily reduced. If components having a lower oxidation-reduction potential than $Cu^{2+}$, such as $Fe^{3+}$, coexist, $Cu^+$ is easily formed, which leads to the deterioration of the transmittance, such being undesirable. Such components may, for example, be $Cr^{3+}$, $Ni^{2+}$, $Co^{2+}$, $Mo^{3+}$ and $Mn^{2+}$ in addition to $Fe^{3+}$, and it is preferred to avoid contamination by such components in glass as far as possible. Specifically, in a case where such components are contained, the total of the contents is preferably less than 0.05%, more preferably less than 0.03%, further preferably less than 0.02%.

The glass of the present invention preferably contains substantially no PbO, $As_2O_3$, $V_2O_5$, $LaF_3$, $YF_3$, $YbF_3$ nor $GdF_3$. PbO is a component to lower the viscosity of glass and to improve the production workability. Further, $As_2O_3$ is a component which acts as an excellent fining agent which can form a fining gas in a wide temperature range. However, as PbO and $As_2O_3$ are environmental load substances, they are preferably not contained as far as possible. As $V_2O_5$ has absorption in the visible region, it is preferably not contained as far as possible in a near infrared cutoff filter glass for a solid state imaging sensor for which a high visible light transmittance is required. Each of $LaY_3$, $YF_3$, $YbF_3$ and $GdF_3$ is a component to stabilize glass, however, their materials are relatively expensive, thus leading to an increase in the cost, and accordingly they are preferably not contained as far as possible. Here, "containing substantially no" means that such components are not intentionally used as materials, and inevitable impurities included from the material components or in the production step are considered to be not contained.

A nitrate compound or a sulfate compound having cation to form glass as an oxidizing agent or a fining agent may be added in the production of the glass of the present invention. The oxidizing agent has an effect to suppress the formation of $Cu^+$ ions in glass, whereby the deterioration of transmittance can be suppressed. The amount of addition of the nitrate compound or the sulfate compound is preferably from 0.5 to 10 mass % by the outer percentage based on the total amount of the material mixture for the above glass composition. If the addition amount is less than 0.5 mass %, no effect of improving the transmittance will be obtained, and if it exceeds 10 mass %, formation of glass tends to be difficult. It is more preferably from 1 to 8 mass %, further preferably from 3 to 6 mass %. The nitrate compound may, for example, be $Al(NO_3)_3$, $LiNO_3$, $NaNO_3$, $KNO_3$, $Mg(NO_3)_2$, $Ca(NO_3)_2$, $Sr(NO_3)_2$, $Ba(NO_3)_2$, $Zn(NO_3)_2$ or $Cu(NO_3)_2$. The sulfate compound may, for example, be $Al_2(SO_4)_3 \cdot 16H_2O$, $Li_2SO_4$, $Na_2SO_4$, $K_2SO_4$, $MgSO_4$, $CaSO_4$, $SrSO_4$, $BaSO_4$, $ZnSO_4$ or $CuSO_4$.

Further, the glass of the present invention is a plate shape, and in a case where the plate thickness is from 0.05 to 0.25 mm, the wavelength at which the transmittance becomes 50%, is preferably from 600 nm to 650 nm. When the glass has such a feature, the desired optical properties can be realized in a sensor which is required to be thin. Further, in a case where the plate thickness is from 0.05 to 0.25 mm, the transmittance at a wavelength of 400 nm is at least 70%, whereby a near infrared cutoff filter glass having superior optical properties can be formed.

The value of the transmittance was converted so as to be a value of a thickness of from 0.05 to 0.25 mm. The conversion for the plate thickness was calculated by the following formula 1. Here, $T_{i1}$ is a transmittance of a measured sample, $t_1$ is a thickness of the measured sample, $T_{i2}$ is a converted value of the transmittance, and $t_2$ is a thickness to be converted (in the case of the present invention, from 0.05 to 0.25). Here, the transmittance was calculated by excluding reflection loss of the front and back surfaces.

$$T_{i2} = T_{i1}^{\frac{t_2}{t_1}} \quad \text{Formula 1}$$

Further, even though the near infrared cutoff filter glass of the present invention has a plate shape having a thin plate thickness, the near infrared cutoff filter glass has good optical properties for downsizing and reducing the thickness of an imaging device and a device mounted thereon. The plate thickness of the glass is preferably at most 1 mm, more preferably at most 0.8 mm, further preferably at most 0.6 mm, most preferably at most 0.4 mm. Further, the lower limit value of the plate thickness of the glass is not particularly restricted, however, considering the durability against breakage at the time of producing glass and transporting into an imaging device, the plate thickness is preferably at least 0.05 mm, more preferably at least 0.07 mm, further preferably at least 0.1 mm.

The glass of the present invention may be provided with an optical thin film such as an antireflection film, an infrared cutting film or a UV and infrared cutting film on its surface. Such an optical film is a monolayer film or a multilayer film and may be formed by a known method such as vapor deposition method or a sputtering method.

The near infrared cutoff filter glass of the present invention can be prepared as follows.

First, raw materials are weighed and mixed so that glass to be obtained has a composition within the above range. This raw material mixture is charged into a platinum crucible and melted by heating at a temperature of from 700 to 1,000° C. in an electric furnace. The molten glass is sufficiently stirred and fined, cast into a mold, annealed, and then cut and polished to be formed into a flat plate having a predetermined thickness. In the above production process, the highest temperature of glass in a molten state is preferably at most 950° C. If the highest temperature of glass in a molten state exceeds 950° C., problems result such that the equilibrium state of oxidation-reduction of Cu ions will be inclined to $Cu^+$ side, whereby the transmittance characteristics will deteriorate, and volatilization of fluorine will be accelerated, and glass tends to be unstable, such being undesirable. The above temperature is more preferably at most 900° C., most preferably at most 850° C. Further, if the above temperature is too low, problems result such that crystallization occurs during melting the glass, and it will take long time until complete melting. The highest temperature of glass in a molten state is preferably at least 700° C., more preferably at least 750° C.

Examples

Glasses in Examples of the present invention and Comparative Examples are shown in Tables 1 to 2. Examples 1 to 12 are working examples of the present invention, and Examples 13 to 14 are comparative examples of the present invention.

Such glasses were obtained in such a manner that materials were weighed and mixed to achieve compositions (cation percentage, anion percentage) as identified in Tables 1 and 2, put in a platinum crucible having an internal capacity of about 400 cc and melted for 2 hours at a temperature of from 800 to 920° C. Then, the molten glass was clarified, stirred, cast into a rectangular mold of 50 mm in length×50 mm in width and 20 mm in height preheated to from 300 to 500° C., and annealed at about 1° C./min to obtain samples.

These glass samples were processed and polished to obtain plate glasses having a plate thickness mentioned in Tables 1 and 2.

Further, as materials of each glass, the followings were used.

$H_3PO_4$ and/or $Al(PO_3)_3$ was used for $P^{5+}$.
$AlF_3$ and/or $Al(PO_3)_3$ was used for $Al^{3+}$.
LiF, $LiNO_3$ and/or $LiPO_3$ was used for $Li^+$.
$MgF_2$ and/or MgO and/or $Mg(PO_3)_2$ was used for $Mg^{2+}$.
$SrF_2$ and/or $Sr(PO_3)_2$ was used for $Sr^{2+}$.
$BaF_2$ and/or $Ba(PO_3)_2$ was used for $Ba^{2+}$.
A fluoride and/or a methacrylate was used for $Na^+$, $K^+$, $Ca^{2+}$ and $Zn^{2+}$.
$CeO_2$ was used for $Ce^{4+}$.
$Sb_2O_3$ was used for $Sb^{3+}$.
CuO was used for $Cu^{2+}$.

In Tables 1 and 2, at sections representing the glass components, the proportions of $P^{5+}$ to S components are represented by cation %, and the proportions of the subsequent $F^-$ and $O^{2-}$ components are represented by anion %.

In Tables 1 and 2, $R^+$ represents the total content of alkali metal ions of $Li^+$, $Na^+$ and $K^+$ to be contained, and $R'^{2+}$ represents the total content of alkaline earth metal ions of $Mg^{2+}$, $Ca^{2+}$, $Sr^{2+}$, $Ba^{2+}$ and $Zn^{2+}$ to be contained.

TABLE 1

|  | 1 | 2 | 3 | 4 | 5 | 6 | 7 |
|---|---|---|---|---|---|---|---|
| $P^{5+}$ | 43.0 | 37.0 | 38.6 | 37.2 | 36.9 | 39.8 | 37.0 |
| $Al^{3+}$ | 9.1 | 11.3 | 12.2 | 10.7 | 11.2 | 8.0 | 10.6 |
| $Li^+$ | 23.9 | 22.4 | 22.2 | 20.7 | 21.6 | 21.1 | 20.6 |
| $Na^+$ | 0.0 | 11.9 | 8.2 | 11.4 | 12.0 | 13.9 | 11.3 |
| $R^+$ | 23.9 | 34.3 | 30.4 | 32.1 | 33.6 | 35.0 | 31.9 |
| $Mg^{2+}$ | 3.3 | 0.0 | 0.0 | 0.0 | 0.0 | 3.0 | 0.0 |
| $Ca^{2+}$ | 4.4 | 4.2 | 5.7 | 5.8 | 5.6 | 4.1 | 5.7 |
| $Sr^{2+}$ | 5.5 | 3.0 | 2.0 | 1.9 | 1.9 | 0.0 | 1.8 |
| $Ba^{2+}$ | 5.7 | 5.1 | 4.1 | 3.9 | 4.0 | 5.1 | 3.8 |
| $R^{2+}$ | 18.9 | 12.3 | 11.8 | 11.6 | 11.5 | 12.2 | 11.3 |
| $Cu^{2+}$ | 5.1 | 5.1 | 6.5 | 8.4 | 6.4 | 5.0 | 9.2 |
| $Ce^{4+}$ | 0.0 | 0.0 | 0.5 | 0.0 | 0.4 | 0.0 | 0.0 |
| Ce + Sb | 0.0 | 0.0 | 0.5 | 0.0 | 0.4 | 0.0 | 0.0 |
| S | 0.0 | 0.0 | 0.0 | 0.0 | 0.0 | 0.0 | 0.0 |
| $F^-$ | 14.0 | 22.8 | 20.7 | 22.0 | 21.4 | 22.3 | 21.5 |
| $O^{2-}$ | 86.0 | 77.2 | 79.3 | 78.0 | 78.6 | 77.7 | 78.5 |
| $(Sr^{2+} + Ba^{2+} + Cu^{2+})/(Al^{3+} + Mg^{2+} + Ca^{2+})$ | 0.97 | 0.85 | 0.70 | 0.86 | 0.73 | 0.67 | 0.91 |
| $(Li^+ + Na^+ + K^+)/(P^{5+} + Al^{3+})$ | 0.46 | 0.71 | 0.60 | 0.67 | 0.70 | 0.73 | 0.67 |
| Devitrification | ○ | ○ | ○ | ○ | ○ | ○ | ○ |
| Plate thickness | 0.23 | 0.23 | 0.15 | 0.10 | 0.11 | 0.20 | 0.08 |
| IR half value | 616 | 625 | 631 | 639 | 647 | 632 | 643 |
| % T400 | 79.0 | 88.1 | 88.8 | 85.9 | 88.8 | 89.4 | 85.0 |

TABLE 2

|  | 8 | 9 | 10 | 11 | 12 | 13 | 14 |
|---|---|---|---|---|---|---|---|
| $P^{5+}$ | 36.8 | 38.1 | 42.1 | 40.3 | 37.5 | 38.0 | 28.5 |
| $Al^{3+}$ | 11.3 | 11.0 | 9.0 | 9.6 | 11.5 | 10.0 | 15.0 |
| $Li^+$ | 21.6 | 21.3 | 29.5 | 26.3 | 22.7 | 21.3 | 18.5 |
| $Na^+$ | 11.8 | 11.6 | 0.0 | 0.0 | 12.0 | 12.6 | 0.0 |
| $R^+$ | 33.4 | 32.9 | 29.5 | 26.3 | 34.7 | 33.9 | 18.5 |
| $Mg^{2+}$ | 0.0 | 0.0 | 0.0 | 3.4 | 0.0 | 0.0 | 4.0 |
| $Ca^{2+}$ | 6.2 | 6.9 | 5.9 | 4.9 | 4.2 | 3.9 | 10.0 |
| $Sr^{2+}$ | 1.9 | 1.9 | 2.5 | 5.9 | 3.0 | 3.0 | 11.0 |
| $Ba^{2+}$ | 4.0 | 3.0 | 5.7 | 6.3 | 5.2 | 5.0 | 6.0 |
| $R^{2+}$ | 12.1 | 11.8 | 14.1 | 20.4 | 12.4 | 11.9 | 31.0 |
| $Cu^{2+}$ | 6.4 | 6.2 | 5.3 | 3.5 | 4.0 | 6.2 | 7.0 |
| $Ce^{4+}$ | 0.0 | 0.0 | 0.0 | 0.0 | 0.0 | 0.0 | 0.0 |
| Ce + Sb | 0.0 | 0.0 | 0.0 | 0.0 | 0.0 | 0.0 | 0.0 |
| S | 0.0 | 0.0 | 0.0 | 0.0 | 0.0 | 0.0 | 0.0 |
| $F^-$ | 23.3 | 21.0 | 16.1 | 14.1 | 22.8 | 23.2 | 40.0 |
| $O^{2-}$ | 76.7 | 79.0 | 83.9 | 85.9 | 77.2 | 76.8 | 60.0 |
| $(Sr^{2+} + Ba^{2+} + Cu^{2+})/(Al^{3+} + Mg^{2+} + Ca^{2+})$ | 0.70 | 0.62 | 0.91 | 0.88 | 0.78 | 1.02 | 0.83 |
| $(Li^+ + Na^+ + K^+)/(P^{5+} + Al^{3+})$ | 0.69 | 0.67 | 0.58 | 0.53 | 0.71 | 0.71 | 0.43 |
| Devitrification | ○ | ○ | ○ | ○ | ○ | X | ○ |
| Plate thickness | 0.15 | 0.20 | 0.15 | 0.21 | 0.17 | 0.21 | 0.21 |
| IR half value | 634 | 622 | 639 | 642 | 640 | 619 | 611 |
| % T400 | 87.1 | 85.8 | 87.6 | 84.4 | 89.0 | 85.9 | 67.2 |

The devitrification property the wavelength at which the transmittance becomes 50% and the transmittance at a wavelength of 400 nm of the glasses produced as described above were evaluated and measured. Further, in Tables 1 and 2, the wavelength at which the transmittance becomes 50% is represented by "IR half value", and the transmittance at a wavelength of 400 nm is represented by "% T400".

In the evaluation of the devitrification property, glass was melted at from 800 to 900° C. for 2 hours, the temperature was lowered to 700° C., the glass was held for 1 hour, and the poured glass was observed by an optical microscope. Glass in which devitrification was not observed was evaluated as "○", and glass in which one or more devitrifications were observed was evaluated as "X".

It is evident from Tables 1 and 2 that in working examples of the present invention, glass having no problem on devitrification and having a high transmittance at a wavelength of 400 nm was obtained. In Example 13 which is comparative example, the problem of the devitrification resulted, since $(Sr^{2+}+Ba^{2+}+Cu^{2+})/(Al^{3+}+Mg^{2+}+Ca^{2+})$ exceeded 1.0. In Example 14 which is comparative example, the transmittance at a wavelength of 400 nm was low, since $(Li^++Na^++K^+)/(P^{5+}+Al^{3+})$ was less than 0.45.

INDUSTRIAL APPLICABILITY

According to the present invention, even though the content of Cu components is large for forming a thin plate, the transmittance of the glass to light in a visible range is high, and a near infrared cutoff filter glass which is excellent in the devitrification property can be obtained. Such a glass is extremely useful as an application of a near infrared cutoff filter glass for an imaging device being miniaturized and made to be thin.

This application is a continuation of PCT Application No. PCT/JP2016/071158, filed on Jul. 19, 2016, which is based upon and claims the benefit of priority from Japanese Patent Application No. 2015-146620 filed on Jul. 24, 2015. The contents of those applications are incorporated herein by reference in their entireties.

What is claimed is:

1. A near infrared cutoff filter glass, which comprises, as represented by cation percentage:

$P^{5+}$ 30 to 50%,
$Al^{3+}$ 5 to 20%,
$R^+$ 20 to 40% where $R^+$ is a total amount of $Li^++Na^++K^+$,
$R'^{2+}$ 5 to 30% where $R'^{2+}$ is a total amount of $Mg^{2+}+Ca^{2+}+Sr^{2+}+Ba^{2+}+Zn^{2+}$,
$Cu^{2+}$ 3 to 15% and comprises, as represented by anion percentage:

$O^{2-}$ 30 to 90% and
$F^-$ 10 to 70%, wherein $(Li^++Na^++K^+)/(P^{5+}+Al^{3+})$ is from 0.58 to 0.73, and $(Sr^{2+}+Ba^{2+}+Cu^{2+})/(Al^{3+}+Mg^{2+}+Ca^{2+})$ is from 0.5 to 1.0, wherein the near infrared cutoff filter glass does not comprise $Ce^{4+}$ and $Sb^{3+}$.

2. The near infrared cutoff filter glass according to claim 1, which comprises, as represented by cation percentage, 0.1 to 30% of $K^+$.

3. The near infrared cutoff filter glass according to claim 1, which comprises, as represented by cation percentage, 20 to 30% of $K^+$.

4. The near infrared cutoff filter glass according to claim 1, which comprises, as represented by cation percentage, 1 to 30% of $Zn^{2+}$.

5. The near infrared cutoff filter glass according to claim 1, which comprises, as represented by anion percentage, 76.7 to 90% of $O^{2-}$.

6. The near infrared cutoff filter glass according to claim 1, which comprises, as represented by anion percentage, 77.2 to 90% of $O^{2-}$.

7. The near infrared cutoff filter glass according to claim 1, which comprises, as represented by anion percentage, 10 to 23.3% of $F^-$.

8. The near infrared cutoff filter glass according to claim 1, which comprises, as represented by anion percentage, 10 to 22.8% of $F^-$.

9. The near infrared cutoff filter glass according to claim 1, which does not comprise at least one member selected from the group consisting of Mg and S.

10. The near infrared cutoff filter glass according to claim 1, which comprises, as represented by cation percentage:

$P^{5+}$ 30 to 48%,
$Al^{3+}$ 6 to 18%,
$R^+$ 20 to 38% where $R^+$ is the total amount of $Li^++Na^++K^+$,
$R'^{2+}$ 5 to 28% where $R'^{2+}$ is the total amount of $Mg^{2+}+Ca^{2+}+Sr^{2+}+Ba^{2+}+Zn^{2+}$,
$Cu^{2+}$ 3.2 to 12% and comprises, as represented by anion percentage:

$O^{2-}$ 30 to 80% and
$F^-$ 10 to 50%.

11. The near infrared cutoff filter glass according to claim 1, which comprises, as represented by cation percentage:

$P^{5+}$ 34 to 44%,
$Al^{3+}$ 7 to 13%,
$R^+$ 24 to 36% where $R^+$ is the total amount of $Li^++Na^++K^+$,
$R'^{2+}$ 10 to 20% where $R'^{2+}$ is the total amount of $Mg^{2+}+Ca^{2+}+Sr^{2+}+Ba^{2+}+Zn^{2+}$,
$Cu^{2+}$ 3.4 to 9% and comprises, as represented by anion percentage:

$O^{2-}$ 30 to 75% and
$F^-$ 15 to 40%.

12. The near infrared cutoff filter glass according to claim 1, which comprises, as represented by cation percentage:

$P^{5+}$ 36.8 to 42.1%,
$Al^{3+}$ 8 to 12.2%,
$R^+$ 29.5 to 35% where $R^+$ is the total amount of $Li^++Na^++K^+$,
$R'^{2+}$ 11.3 to 14.1% where $R'^{2+}$ is the total amount of $Mg^{2+}+Ca^{2+}+Sr^{2+}+Ba^{2+}+Zn^{2+}$, and
$Cu^{2+}$ 4 to 9.2%.

13. The near infrared cutoff filter glass according to claim 1, wherein in a plate thickness of from 0.05 to 0.25 mm, the wavelength at which the transmittance becomes 50% is from 600 nm to 650 nm, and the transmittance at a wavelength of 400 nm is at least 70%.

14. The near infrared cutoff filter glass according to claim 1, wherein, in a plate thickness of from 0.05 to 0.25 mm, the transmittance at a wavelength of 400 nm is at least 84.4%.

15. The near infrared cutoff filter glass according to claim 1, wherein in a plate thickness of from 0.05 to 0.25 mm, the transmittance at a wavelength of 400 nm is at least 85%.

16. The near infrared cutoff filter glass according to claim 1, wherein
in a plate thickness of from 0.05 to 0.25 mm, the transmittance at a wavelength of 400 nm is from 85% to 89.4%.

* * * * *